C. J. BOUSFIELD.

DEVICE FOR REMOVING PUPPET VALVES.

APPLICATION FILED MAY 14, 1919.

Reissued July 26, 1921. 15,162.

2 SHEETS—SHEET 1.

Charlie J. Bousfield INVENTOR

BY

Geo. B. Willcox ATTORNEY

C. J. BOUSFIELD.

DEVICE FOR REMOVING PUPPET VALVES.

APPLICATION FILED MAY 14, 1919.

Reissued July 26, 1921. 15,162.

2 SHEETS—SHEET 2.

Charlie J. Bousfield INVENTOR

BY

Geo. B. Willcox ATTORNEY

UNITED STATES PATENT OFFICE.

CHARLIE J. BOUSFIELD, OF BAY CITY, MICHIGAN.

DEVICE FOR REMOVING PUPPET-VALVES.

15,162. Specification of Reissued Letters Patent. Reissued July 26, 1921.

Original No. 1,245,667, dated November 6, 1917, Serial No. 81,896, filed March 3, 1916. Application for reissue filed May 14, 1919. Serial No. 297,176.

*To all whom it may concern:*

Be it known that I, CHARLIE J. BOUSFIELD, a citizen of the United States, and resident of Bay City, Bay county, State of Michigan, have invented new and useful Improvements in Devices for Removing Puppet-Valves; and I do hereby declare the following to be a full, clear, and exact description of the invention, such as will enable others skilled in the art to which it pertains to make and use the same.

This invention is a device for lifting the lower ends of valve springs of internal combustion engines by compressing the springs, in order to facilitate the removal of the valves when it is desired to replace or repair them.

The objects of the invention are to provide a lifting device of simple construction that can be easily and quickly attached to and removed from a valve spring and that will raise even a stiff spring without the exercise of a great amount of force by the operator.

A further object is to provide a spring-lifting device that will automatically lock itself in position when the spring is raised and that will permit free access to the valve-spring washer and to the lower end of the valve stem while the spring is compressed, without liability of slipping and injuring the operator.

With these and certain other objects in view which will appear later in the specification my invention consists in the devices described and claimed and the equivalents thereof.

In the drawings, Figure 1 is a part sectional side view of the valve spring of an engine, showing the device in its preferred form applied to the washer and in position to commence lifting the spring.

Figure 1:
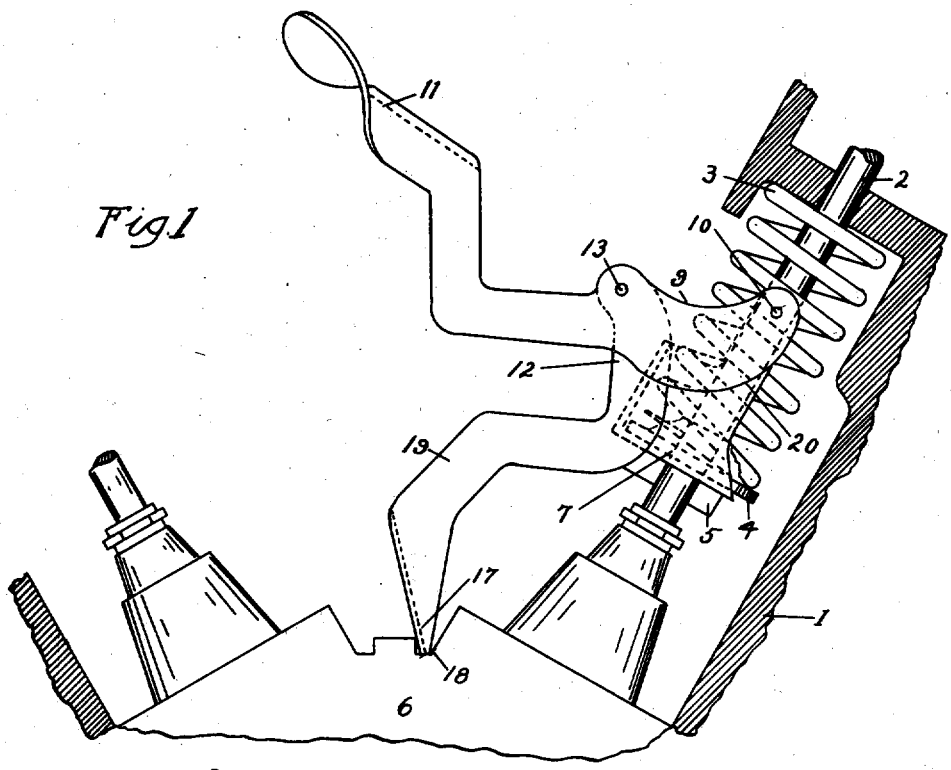

In the drawings, 1 represents the cylinder casting of the engine, 2 the valve stem, 3 the usual valve spring, and 4 the washer loosely fitting the valve stem and supporting the lower end of the spring 3. The washer 4 is usually held in place by a key 5 or its equivalent. The key passes through a transverse opening in the valve stem 2. 6 indicates the base or frame of the engine.

When it is desired to renew or replace a valve it is necessary to lift the valve stem 2, which is normally pressed downward by the compressive force of the spring 3, and to release the valve and its stem 2 it is necessary to lift the lower end of the spring 3 against its compressive force and thus free the key 5, or other fastening device, so it can be removed.

To easily and quickly lift the spring and to hold it in its raised position I provide a support such as a cup or receptacle 7 to receive the lower end of the spring and to lift it. The cup is preferably provided with upwardly projecting lugs 8 pivotally secured at their upper ends to the lever 9 by means of pivots 10. The handle 11 of the lever is of any suitable shape, but is preferably L-shaped, as shown in Fig. 1.

Figure 3:
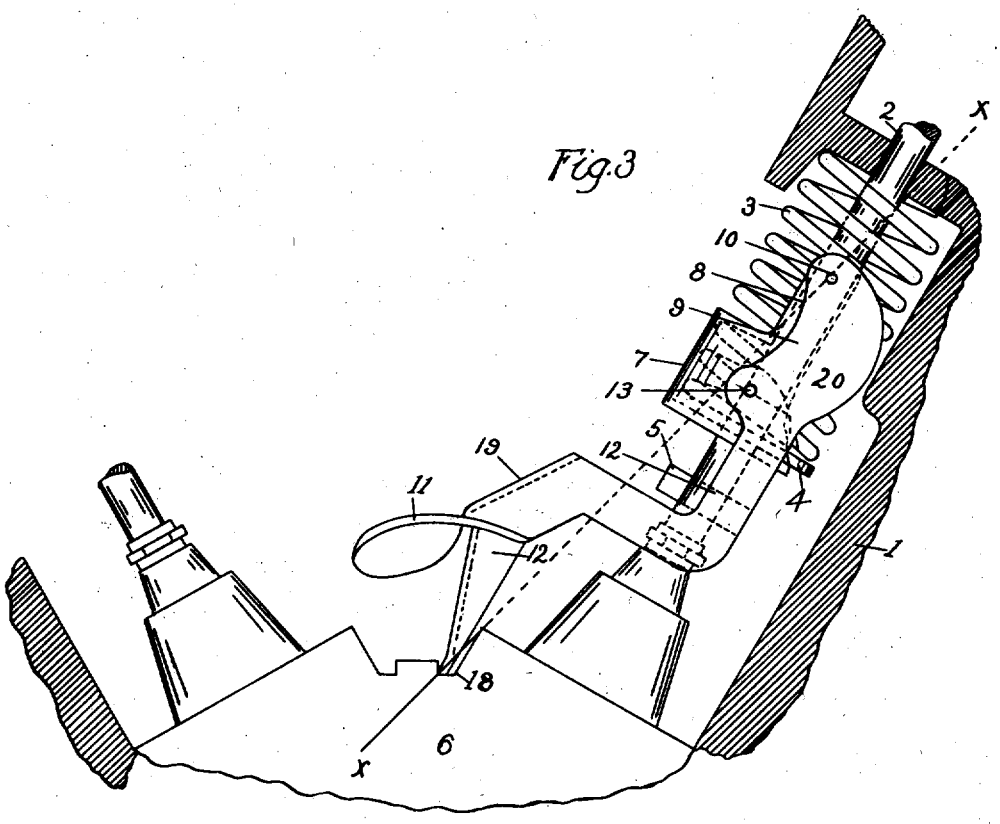
Fig. 3 is a side view of the parts shown in Fig. 1, the lifting device being shown in the position it occupies after having lifted the spring.
Figure 4:
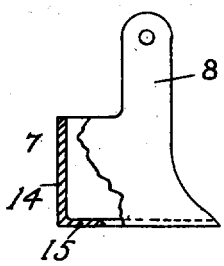
Fig. 4 is a part sectional side view of a preferred form of lifting cup.
Figure 5:
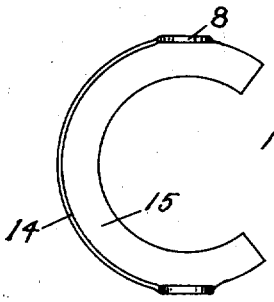
Fig. 5 is an enlarged top plan view of the same.

A correspondingly L-shaped thrust bar 12 is pivoted near its upper end to the lever 9 by means of pivots 13, as shown in Figs. 1 and 3.

The cup 7 is preferably formed with a part-cylindrical rim 14 adapted to extend around and inclose the outer part of the spring 3 when the device is in place. An interrupted annular flange 15 is formed around the lower edge of the rim 14, leaving an opening 16 at one side to permit the cup to be slipped over the stem 2.

The thrust bar 12, which as has been noted, is preferably L-shaped to conform to the shape of the arm of the handle 11 so as to give free access to the spring, has its lower end supported on the base 6, and it may be held against slipping by resting in a groove 18 formed in the base.

To use the device for lifting a spring, the lower end of the thrust bar is placed on the base 6 while the handle 11 is in the raised position shown in Fig. 1 and the cup 7 is slipped in place with the flange 15 engaging the under-side of the washer 4. The handle 11 is then forced down to the position shown in Fig. 3, thereby raising the washer 4, compressing the spring 3 and releasing the key 5 from engagement with the washer, as shown in Fig. 3. When in its lowered position, the handle 11 rests against the thrust bar 12, the edge 19 of the bar 12 serving as a stop. In this position the thrust of the spring 3 locks the thrust bar 12 and the handle 11 so they can not become accidentally displaced.

It will be observed in Fig. 3 that when the handle is in its lowered position the pivotal point 13 lies beyond the line X—X connecting the upper pivotal point 10 with the point of support at 18. The lever and thrust bar thus constitute a self-locking toggle lever.

Figure 2:
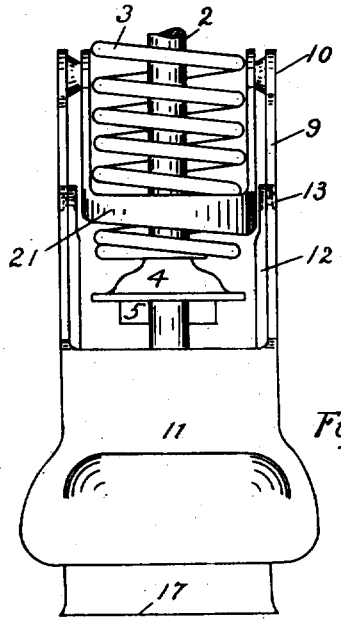
Fig. 2 is a front view of the device showing a modified form of lifting cup, the cup and spring being in raised position.
Figure 6:
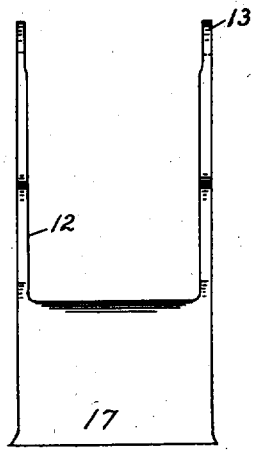
Fig. 6 is a front view of the thrust-bar detached.

The upper parts of the lever and of the thrust bar are preferably bifurcated, one member located at each side of the spring, as shown in Figs. 2 and 6, the lower ends being formed in one piece respectively, as at 11 and 17. Thus both members may be conveniently and cheaply made of sheet metal, each member formed of a single piece.

It will be noted that I have described the support or cup 7 as taking under the washer 4, but it is not essential that this particular form of cup or support be used. A modified form of the cup is shown in Fig. 2, where 21 is a cup adapted to engage one of the lower convolutions of the spring 3, thereby lifting the lower end of the spring clear of the washer 4, so the washer may be easily lifted from the key 5, permitting the key to be removed or the valve stem lifted.

To permit the raising of the valve spring 3 without liability of bringing lateral pressure or bending strain on the valve stem 2 to cause the stem to bind, I prefer to make the lug 8 of the cup of considerable length, in order that the point of suspension 10 may be relatively high above the lifting flange of the cup. By this means the angular displacement of the cup, due to the relative movement of the pivotal points 10 and 13 is reduced to a minimum and the spring is lifted in a substantially straight line without any appreciable binding action being brought on the stem 2. To further guide the travel of the cup I prefer to form the back edge of the lever 9 with an outward curvature, as indicated at 20, the back edge of the lever thereby forming a guide that engages the side wall of the cylinder 1 to keep the pivotal point 10 and the cup in substantial alinement.

By the means above described, I have produced a simple and effective lifting device that can be quickly applied to the valve stems of engines to lift the valve springs. It enables even a very stiff spring to be lifted with ease because the handle 11 travels through a relatively long distance from its open position to its locked position, and the leverage or power exerted by the handle increases with the increased resistance of the spring due to its compression. The device is so constructed that the lower part of the spring, the washer and key are all easily accessible when the spring is lifted. Risk of accident to the operator by slipping of the spring is obviated, for the device is firmly locked by the pressure of the spring itself, when the spring is in its raised position.

Having thus described my invention, what I claim and desire to secure by Letters Patent is:

1. In a spring-lifting device of the class described, the combination of a lifting cup adapted to be removably applied around the valve stem and adapted to lift the spring, a bifurcated lever pivotally secured to the upper part of said cup and having a handle, a thrust bar pivoted at its upper end to said lever, its lower end adapted to engage a stationary support, the pivotal connection between the lever and thrust bar adapted to travel past an imaginary line connecting the pivotal connection of the cup and the point of support of the thrust bar, to lock the thrust bar and lever in place, said thrust bar engaging said handle when in locked position, for the purposes set forth.

2. In a spring-lifting device for engine valves, the combination of a lifting cup formed with an interrupted flange adapted to be removably applied around the valve stem and adapted to lift the lower end of the spring, a bifurcated lever pivotally secured to the upper part of said cup, and having a handle, a bifurcated thrust bar pivoted at its upper ends to said lever, its lower end adapted to engage a stationary support.

3. In a spring-lifting device for engine valves, the combination of a lifting cup formed with an interrupted flange and upwardly extending lugs, said cup adapted to be removably applied around the valve stem and to engage the spring to lift it, a bifurcated lever pivotally secured at its ends to the ends of said lugs and having a handle, a bifurcated thrust bar pivoted at its upper ends to said lever, its lower end adapted to engage a stationary support.

4. In a valve-spring lifting device of the class described, the combination of a lifting cup formed with an interrupted annular flange adapted to be removably applied around the valve stem and adapted to lift the spring, a bifurcated L-shaped lever pivotally secured to the upper part of said cup and having a handle, a bifurcated L-shaped thrust bar pivoted at its upper end to said lever, its lower end adapted to engage a stationary support, and a stop on said bar adapted to be engaged by said lever, for the purposes set forth.

5. In a spring-lifting device of the class described, the combination of a lifting cup formed with an interrupted annular flange adapted to be removably applied around the valve stem and adapted to lift the spring, a bifurcated lever pivotally secured to the upper part of said cup, and having a handle, the rear edges of said lever being curved and adapted to engage a stationary part of the engine, a bifurcated thrust bar pivoted at its upper ends to said lever, its lower end adapted to engage a stationary support.

6. In a spring-lifting device for engine valves, the combination of a lifting cup formed with an interrupted flange adapted to be removably applied around the valve stem and adapted to lift the lower end of the spring, a bifurcated lever pivotally secured to the upper part of said cup and having a handle, a bifurcated thrust bar pivoted at its upper ends to said lever, its lower end adapted to engage a stationary support, the pivotal connection between the lever and thrust bar adapted to travel past an imaginary line connecting the pivotal connection of the cup and the point of support of the thrust bar, said thrust bar engaging said handle to stop its further inward movement.

7. A valve spring compressor comprising a valve spring support, a pair of links pivotally connected adjacent to said support, one of said links having one end pivotally connected to said support at a point adjacent to said spring and the other of said links having one end adapted for engagement with a stationary element, means for moving said links relatively to each other to elevate said support and compress the spring, and means for locking said links against further or return movement after a predetermined movement of said operating means.

8. A valve spring compressor comprising a valve spring support, a pair of pivotally connected links constituting a toggle, one of said links extending downwardly from a point adjacent the support when the toggle is set for lifting position and having an end adapted to bear against a stationary part below said support when the compressor is in said position, and means for moving the joint of said toggle past dead-center to compress the spring and lock said support against return movement.

9. A valve spring compressor comprising a member adapted to support a valve spring seat, a toggle including a pair of pivotally connected links, one link having one end pivotally connected to said member and the other link having one end adapted for engagement with a stationary element, the points of pivotal connections between said links and between one of said links and said member respectively lying between said stationary part and one end of the valve stem, and an operating member formed integral with one of said links for straightening the toggle to a point past dead-center and elevating and locking said first mentioned member, said operating member movable in said operation into a position substantially parallel with the link adapted to engage said stationary part.

10. A valve spring compressor comprising a member adapted to support a valve spring seat, and a lever pivoted thereto at a point a short distance from the said spring seat said lever having fulcrum means pivoted thereto intermediate of its ends and adjacent said spring seat for engaging with a stationary element to effect the bodily movement of said member during the swinging of said lever and the locking of said member against return movement when said lever is in final limiting position.

11. A valve spring compressor for internal combustion engines, comprising a member adapted to support a valve spring seat and having an aperture to receive a valve stem, and a lever pivoted to said member adjacent to said seat and movable from a substantially horizontal position to a position substantially paralleling the valve stem of the spring to be raised, said lever having fulcrum means intermediate of its ends for engagement with a stationary part of the engine during the swinging of said lever to effect the raising of said member, said means serving to lock said lever against return movement when said lever is in maximum raised position.

12. A valve spring compressor insertible within an engine cylinder and comprising a support for a valve spring seat having a part extending perpendicularly therefrom, a toggle connected to said perpendicular part, and means for straightening the toggle to a point past dead center to raise said support and lock the latter against return movement.

13. A valve spring compressor comprising a plate adapted to support a valve spring seat, said plate having a flange integrally formed therewith and extending substantially at right angles thereto, a lever pivotally mounted on said flange, and a fulcrum lever pivotally carried by said first mentioned lever, said levers being adapted to automatically lock against movement and hold said plate in raised position when said first mentioned lever is pivotally moved to one limiting position.

14. In a valve spring compressor, in combination with a valve spring support, two toggle arms, one of said arms directly pivoted to the support near said spring, the other of said toggle arms pivoted to the first arm, a free end of said second arm adapted for direct fulcrum bearing upon a stationary support.

15. In a valve spring compressor, in combination with a valve spring supporting plate of limited area and bodily movable on the valve stem longitudinally thereof, toggle arms, one of which is directly pivoted to a part of the plate adjacent the valve stem, the other arm being pivoted at one end directly to the first arm and having its other end free and adapted for direct fulcrum bearing on a stationary part below the spring.

16. In a valve spring compressor, in combination with a valve spring supporting member adapted to embrace the valve stem and extending substantially in a plane at right angles to the axis of the stem, said member having a part extended therefrom parallel to said stem axis, two toggle arms, one of which is pivoted to said part, adjacent the stem, and the other of which is pivoted at one end to said first arm and at the other end is adapted to bear against a stationary part.

17. In a valve spring compressor, in combination with a valve spring seating member, said member having a part extending perpendicularly thereto, a lever suitably secured to the upper part of said perpendicular part above the seat, said lever having a handle, a thrust bar pivoted at its upper end to said lever and having its lower end adapted to extend below the seat and engage a stationary support.

18. In a valve spring compressor, in combination with a valve spring seating member formed with an interrupted perpendicular flange adapted to be removably applied around the valve stem, a bifurcated lever pivotally secured to the upper part of said flange and at a point between the ends of the valve stem and above said seat, said lever having a handle and a bifurcated thrust bar pivoted at its upper ends to said lever above the line of said seat, the lower end of said thrust bar being adapted to engage a stationary support.

CHARLIE J. BOUSFIELD.